… … …

UNITED STATES PATENT OFFICE.

EDWARD J. WINSLOW, OF CHICAGO, ILLINOIS.

ANHYDROUS HYDRAULIC CEMENT AND PROCESS.

No. 837,169.     Specification of Letters Patent.     Patented Nov. 27, 1906.

Application filed September 24, 1906. Serial No. 335,973.

*To all whom it may concern:*

Be it known that I, EDWARD J. WINSLOW, a citizen of the United States, residing in Chicago, in the county of Cook and State of Illinois, have invented a certain new and useful Anhydrous Hydraulic Cement and Process, of which the following is a specification.

This invention relates to improvements in hydraulic cements which are in an anhydrous condition in contradistinction from a hydrated or set condition, and it concerns a peculiar method of manufacturing the improved cement.

One object of this invention is to obtain a dry pulverulent hydraulic cement in anhydrous state and having very intimately and thoroughly commingled therewith a multiplicity of very minute unitary fibers of asbestos, which mixture is adapted to be used in much the same manner as an ordinary hydraulic cement by the application of water, but which will when hardened possess greater tensile strength and resiliency.

Another object is to provide a cementitious composition of the foregoing nature which can be shipped in a condition suitable for being hydrated at a later time and then shaped or molded, as may be desired, without rendering it necessary for the user to undertake the difficult operation of introducing the fiber in the intimate degree essential to its best advantage.

Another object is to formulate a method of intimately commingling a multiplicity of unitary fibers of asbestos with a dry pulverulent anhydrous hydraulic cement which will be cheap, easily carried out, and effective and which will be characterized by a pulverulent product which is in an anhydrous state and capable of being rendered plastic and self-setting by the addition of water.

In order that the essential characteristics of this invention may be clearly understood, it may be pointed out that hydraulic cement is not materially improved in strength and resiliency by the addition of shredded asbestos unless the latter be in an exceedingly finely-divided state—that is to say, it must be so far divided that the resultant fibers or filaments are incapable of being readily further divided along natural paths of cleavage. Fibers of this nature may be termed the "component" fibers of the asbestos. The underlying necessity for this extreme division will be grasped by remembering that every shred of substantial size when embedded in cement is a source of weakness rather than strength, because such shred affords natural paths of cleavage, and the cement therefore tends to split along such shred with a part thereof adhering to the respective pieces of cement. Heretofore the practice has been to mix the asbestos with the hydraulic cement by means of a so-called "flotation" process in which the mixing has been accomplished through the agency of water in which the fiber and particles of cement are held in suspension. This "solution," as it may be termed, is thoroughly agitated until a thorough mix is obtained. The use of a cement fiberized in this way is unfortunately very restricted, for the reason that the use of water causes the hydraulic cement to become hydrated, and it is therefore necessary to at once shape or mold the pasty mixture before it can harden or set. As will be obvious, such a mixture cannot be used at a point appreciably distant from the mixing plant, and as the latter is somewhat complex in nature and requires some little manipulative skill to get satisfactory results the use of highly-fiberized cement has been noticeably limited.

Notwithstanding the fact that it has hitherto been regarded as imperative that water be employed in practice as the mixing agent and that the requisite intimacy of mix and fineness of division of the asbestos could not otherwise be practically obtained, I have discovered after an exhaustive series of experiments that an exceedingly thorough mix can be obtained without in any wise hydrating the hydraulic cement, thereby producing a peculiar pulverulent cementitious material which can be subsequently hydrated and caused to harden and set into any desired shape. Thus I have obtained an independence between the operations of fiberizing the cement and the molding thereof which has hitherto been unobtainable in practice. It may be noted at this point that it is of the utmost importance that the asbestos fibers be not materially injured either during the division of the asbestos pieces or during the mixing with the hydraulic cement. This is one of the difficulties encountered when the operation is attempted in the absence of water. This, as well as the difficulties of dividing sufficiently fine and of mixing in the proper way, I have entirely overcome in an exceedingly simple and effective manner.

This method is based upon the discovery, contrary to all expectations, that if the dry hydraulic cement in pulverulent or granular condition be placed, together with asbestos of the usual commercial form, into a suitable retaining vessel, which is preferably of cylindrical shape and revolvably mounted, and then agitated, together with a number of rounded hard heavy objects, the asbestos will be properly divided and separated into component fibers and at the same time be intimately commingled with the cement. In practice, it is preferable to employ for said objects some hard material which will not discolor the cement by its grindings, and to this end, tough hard fair-sized flint pebbles will be found very suitable. Steel balls may also be used; but their grindings tend to discolor cement by subsequently rusting. These pebbles or balls are preferably loosely carried within the retaining vessel, so that as the latter is rotated they may tumble around and collide with the asbestos and the cement. Peculiar as it may seem, the impacts resolve the asbestos into substantially its component fibers without materially breaking, crushing, or otherwise injuring them, and at the same time such fibers are thoroughly intermingled with the cement, so that, practically speaking, each fiber is coated with cement and is separated by such cement from its companions.

The composition produced by means of this art can be handled and treated as ordinary hydraulic cement and when hydrated and molded will be found to be not only hard and strongly resistant to compression, but also very tough and of high tensile strength. It may be, after setting, cut and otherwise worked, much as hard wood, without splitting or otherwise yielding.

It is to be understood that the composition and method may be subject to certain obvious adaptations and modifications within the scope of the appended claims and that the language thereof is intended to cover all of the generic and specific features of the herein-described invention and all statements of the scope thereof which, as a matter of language, might be said to fall therebetween.

I accordingly claim as my invention and desire to secure by Letters Patent—

1. A pulverulent cementitious composition of matter adapted to be set by the admixture of water consisting mainly of a mass of pulverulent anhydrous hydraulic cement, and a suitable quantity of dry asbestos mixed therewith, said asbestos being thoroughly divided into a multiplicity of minute component fibers which are thoroughly commingled with said dry pulverulent cement.

2. A pulverulent cementitious composition of matter adapted to be set by the admixture of water, composed mainly of a mass of pulverulent anhydrous hydraulic cement, and a quantity of asbestos dry-ground therewith and thoroughly divided into a multiplicity of separate component fibers which are intimately commingled with said dry pulverulent cement.

3. A process of making a pulverulent cementitious composition of matter adapted to be set by the admixture of water, which consists in bringing together within a retaining vessel a mass of anhydrous hydraulic cement, a quantity of relatively coarse dry asbestos, and a number of independently-movable rounded objects of heavy hard material, then agitating said contents of said vessel, whereby said asbestos will be divided into a multiplicity of separate component fibers and the latter intimately commingled with the dry pulverulent hydraulic cement.

In witness whereof I have signed the foregoing in the presence of the two undersigned witnesses.

EDWARD J. WINSLOW.

Witnesses:
LEE RODGERS,
S. H. PRICE.